(12) United States Patent
Chao et al.

(10) Patent No.: US 6,711,107 B2
(45) Date of Patent: Mar. 23, 2004

(54) SYSTEM FOR CONSTANT ANGULAR VELOCITY DISK RECORDING AND METHOD FOR LASER POWER CONTROL THEREOF

(75) Inventors: Chi-Mou Chao, Hsinchu (TW); Daw-I Wang, Hsinchu (TW); Tsung Yueh Shih, Hsinchu (TW)

(73) Assignee: Acer Laboratories Inc. (TW)

( * ) Notice: Subject to any disclaimer, the term of this patent is extended or adjusted under 35 U.S.C. 154(b) by 250 days.

(21) Appl. No.: 09/919,849

(22) Filed: Aug. 2, 2001

(65) Prior Publication Data
US 2002/0114234 A1 Aug. 22, 2002

(30) Foreign Application Priority Data
Feb. 9, 2001 (TW) .................................. 90102986 A (51) Int. Cl.$^7$ ................................................. G11B 7/00
(52) U.S. Cl. ................ 369/47.52; 369/47.5; 369/59.12
(58) Field of Search ........................... 369/47.5, 47.51, 369/47.52, 47.53, 59.12

(56) References Cited

U.S. PATENT DOCUMENTS 6,504,806 B1 * 1/2003 Nakajo ..................... 369/59.12
6,577,571 B2 * 6/2003 Takeda et al. .............. 369/47.5

* cited by examiner

Primary Examiner—Doris H. To
Assistant Examiner—Jorge Ortiz-Criado
(74) Attorney, Agent, or Firm—Michael D. Bednarek; Shaw Pittman LLP (57) ABSTRACT

The system and method is used for CAV (Constant Angular Velocity) control format recording, whereas the existing disk data is recorded under CLV (Constant Linear Velocity) control format recording. When the PUH receives a laser driver signal, it generates a feed signal and a wobble signal. The feed signal is received by the automatic power control; thereafter the automatic power control generates a first control signal used for causing the laser driver to adjust the laser driver signal. After the ATIP decoder receives the wobble signal, the ATIP decoder generates and outputs ATIP decoded data to the CLV value detector. The CLV value detector receives ATIP decoded data and generates a CLV decoded data to the laser power control. The laser power control receives the CLV decoded data and generates a second control signal used for causing the automatic power control to adjust the first control signal.

21 Claims, 8 Drawing Sheets

SYSTEM FOR CONSTANT ANGULAR VELOCITY DISK RECORDING AND METHOD FOR LASER POWER CONTROL THEREOF

REFERENCE TO RELATED APPLICATIONS

This application claims the benefit of priority under 35 U.S.C. §119(a) of Taiwan Patent Application No. 090102986, filed Feb. 9, 2001

BACKGROUND OF THE INVENTION

1. Field of the invention

The invention generally relates to optical drives and laser power control methods, and more particularly to a system and a method for Constant Angular Velocity control format.

2. Description of the Related Art

Among optical recording drives, control format for recording can be categorized into CAV (Constant Angular Velocity) and CLV (Constant linear Velocity) control formats. With CAV control format, a disk rotates at a constant speed regardless of what area of the disk is being accessed. Rotational speed of a spindle in the optical recording drive is constant. Data are recorded into tracks of an optical disk. Tracks are formed in a spiral line extending from the inner to the outer of an optical disk. On the other hand, the purpose of CLV is to ensure a constant data rate regardless of where on the disk the data is being accessed. With CLV, the rotation speed of the disk changes based on how close to the center of the disk the data is. For tracks near the center, the disk rotates faster, and for data on the outside, the disk rotates slower.

Current CD-ROM or CD-RW drive uses CLV control format for disk recording. Data is recorded at a uniform density with CLV control format onto a disk. As the high rotational speed of the spindle develops, CLV control format cannot cope with the demands come with high rotational speed. A recent development utilizing a CAV control format recording, whereas disk data recording performance approximates to the resulted uniform density from CLV control format recording. For example, for an optical drive under 16 times CLV control format, the rotational speed of inner tracks is 800 rpm. In contrast, for an optical drive using 16 times CAV control format recording, performance of the outer tracks recording can be as high as the performance gained from an optical drive using 40 times CLV control format recording.

In order to cope with the spindle operation adapting a CAV control format, two technical problem must be resolved: one is laser power has to be subject to the linear velocity changes, the other is recording pulse has to be subject to the linear velocity changes of a disk.

SUMMARY OF THE INVENTION

To realize the above-described technologies, the invention discloses a system and method for laser power control. The system and method is used for CAV (Constant Angular Velocity) control format recording, whereas the existing disk data is recorded under CLV (Constant linear Velocity) control format recording. The system according to the invention comprises: a spindle, a spindle control, a PUH (pick-up head), a laser driver, an automatic power control, a write pulse generator, a clock synthesizer, an ATIP (Absolute Time In Pre-grooves) decoder, a CLV value detector, a laser power control, and a dynamic write strategy table.

The spindle takes control of rotating of an optical disk with CAV control format via the spindle control. The PUH is used for reading/recording data from/onto an optical disk. The laser driver is used for generating and outputting a laser driver signal to the PUH. When the PUH receives a laser driver signal, it generates a feed signal and a wobble signal, the wobble signal reflected by the optical disk and then read by the PUH. The feed signal is received by the automatic power control; thereafter the automatic power control generates a first control signal used for causing the laser driver to adjust the laser driver signal. After the ATIP decoder receives the wobble signal, the ATIP decoder generates and outputs ATIP decoded data to the CLV value detector. The CLV value detector receives ATIP decoded data and generates a CLV decoded data to the laser power control. The laser power control receives the CLV decoded data and generates a second control signal, which is used for causing the automatic power control to adjust the first control signal.

With the clock signal provided by the clock synthesizer, the write pulse generator generates a write pulse signal to control the laser driver signal of laser driver. The dynamic write strategy table also receives CLV decoded data and then generates a third control signal for causing the write pulse generator to adjust the write pulse signal.

The dynamic write strategy table comprises: a CLV value detector, a decoder and a recorded medium. The CLV value detector is used for receiving the CLV decoded data, determining a CLV value of the CLV decoded data is within a fixed range and generating a CLV value signal. Wherein, the CLV value signal comprises an index value representing the fixed value range. The decoder receives the CLV value signal and as a result generates a corresponding address signal. The recorded medium is used for recording a plurality of write strategy patterns. Each write strategy pattern corresponds to an address signal and thereafter generating a corresponding third control signal. The CLV value detector comprises a matrix used for determining the fix value range corresponding to the CLV value. Wherein the CLV value detector can be either software or hardware. In addition, the recorded medium can be performed by a SRAM (Static Random Access Memory).

In the above-described system, the ATIP decoded data comprises predetermined absolute time in pre-grooves and biphase clock, wherein the biphase clock is used to cause clock synthesizer to generate a clock signal. The CLV decoded data comprises a CLV value resulted from disk real-time rotating. The CLV value equals to the count of the biphase clock detected by the CLV value detector at the fixed time interval. In addition, the second control signal comprises a laser recording power value corresponding to the CLV value. The laser power value can be set as a fixed value. The fixed value can be gained from an optimized value in experiments.

According to prior art system, the disk inner track area comprises a PCA (Power Calibration Area), where a laser power calibration such as an OPC (Optimal power Calibration) occurring. The present invention provides an alternative, an external laser PCA, which is on the second half of the lead out area on the outer track area. Wherein the external laser PCA is divided into 100 units. Each unit is divided into 15 blocks, which are used for providing laser power control for performing an OPC.

When the spindle is under fixed CAV control format, a linear equation for optimized laser recording power is generated from interpolation, which is used for calculating an optimized laser recording power with desired CLV value. An OPC in the PCA is performed and renders an optimized laser recording power of the inner track area of the disk. At the same time, the CLV value detector detects a CLV value of the inner track area. In the same way, an OPC in the PCA is performed and renders an optimized laser recording power of the outer track area of the disk. The CLV value detector detects another CLV value of the inner track area. Accordingly, using interpolation with the two sets of CLV values and corresponding optimized laser recording power from the OPC in the PCA in the inner and outer track, a linear equation for optimized laser recording power is generated.

In addition, when the spindle is under variable CLV control format, a linear equation for optimized laser recording power is generated by extrapolation. At first, set the spindle under a first fixed multiple CLV control format. An OPC in the PCA is performed and renders an optimized laser recording power of the inner track area of the disk. At the same time, the CLV value detector detects a CLV value of the inner track area. Then, set the spindle under a second fixed multiple CLV control format. Similarly, an OPC in the PCA is performed and renders an optimized laser recording power of the inner track area of the disk. At the same time, the CLV value detector detects a CLV value of the inner track area. Accordingly, using extrapolation with the two sets of CLV values and corresponding optimized laser recording power from the OPC in the PCA in the inner track under the first and the second multiple CLV control format, a linear equation for optimized laser recording power is generated.

BRIEF DESCRIPTION OF DRAWINGS

The following detailed description, given by way of an example and not intended to limit the invention to the embodiments described herein, will best be understood in conjunction with the accompanying drawings, in which.

DETAILED DESCRIPTION OF THE INVENTION

Figure 1:
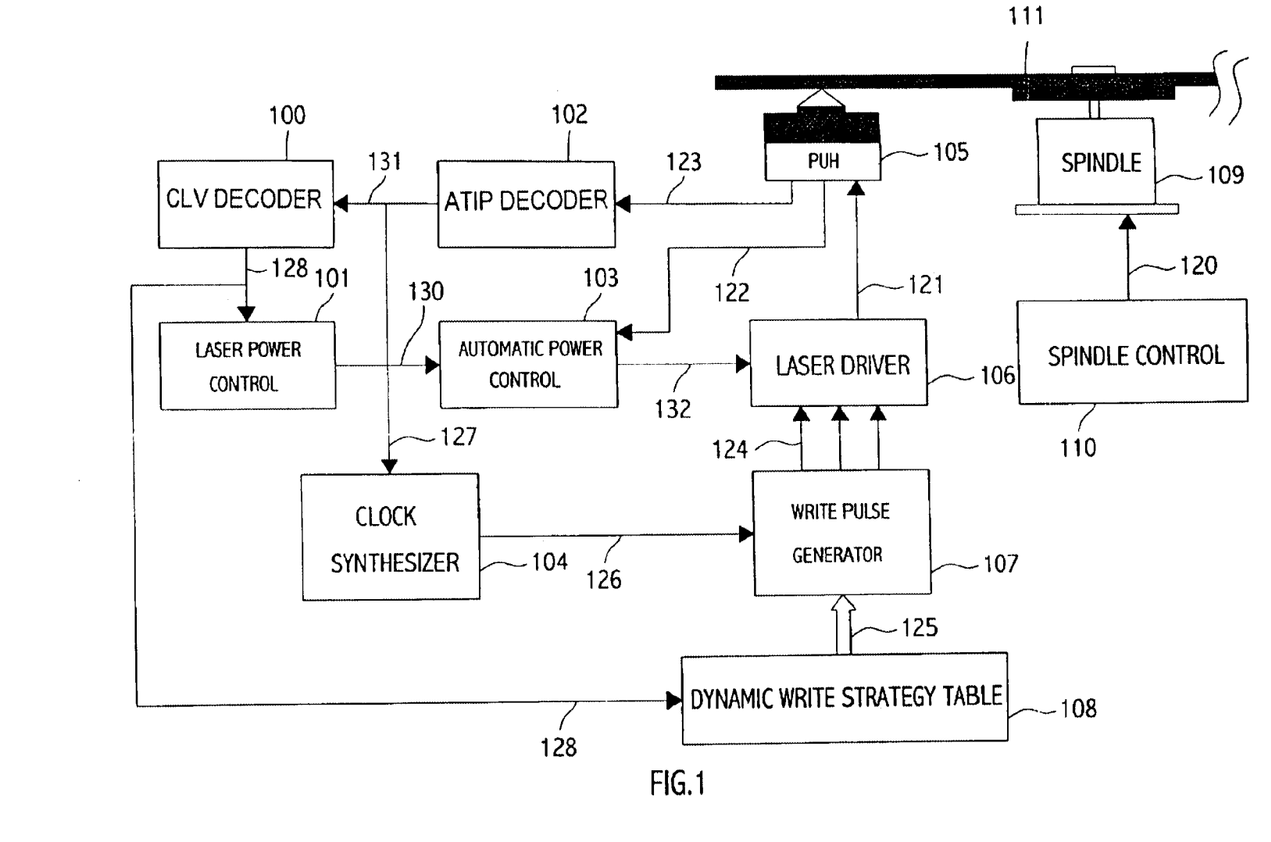
FIG. 1 is a block diagram of a system of the present invention.

The preferred embodiment of the system and method for laser power control thereof is explained referring to the drawings. FIG. 1 is block diagram of the system showing an embodiment according to the present invention. The system in the FIG. 1 comprises a spindle 109, a spindle control 110, a PUH (pick-up head) 105, a laser driver 106, an automatic power control 103, a write pulse generator 107, a clock synthesizer 104, an ATIP (Absolute Time In Pre-grooves) decoder 102, a CLV (Constant Linear Velocity) value detector 100, a laser power control 101, and a dynamic write strategy table 108. The control signal 120 of the spindle control 110 is used for rotating the disk 111 under CAV (Constant Angular Velocity) control format. The PUH 105 is used for reading/recording data from/to disk 111 the disk 111. The laser driver 106 is used for generating a laser driver signal 121 and then outputting to the PUH 105, laser head is initiated, it generates a feed signal 122. The laser beam travels through an object lens to the disk surface and reflects. XXX Reflected laser beam samples the wobble signal 123 on the disk tracks. Thereby wobble signal 123 is received. Thereafter the feed signal 122 received by the automatic power control 103, the automatic power control 103 generates a first control signal 132 used for causing laser driver 106 to adjust the laser driver signal 121. The wobble signal 123 is received by the ATIP decoder 102 and generates an ATIP decoded data 131 outputting to the CLV value detector 100. CLV value detector 100 receives the ATIP decoded data 131 and generates a CLV decoded data 128 outputting to the laser power control 101. The laser power control 101 is caused by received CLV decoded data 128 to generate a second control signal 130, which is then used to cause automatic power control 103 to adjust the first control signal 132.

The write pulse generator 107 is caused by the clock signal 130 provided by the clock synthesizer 104 to generate a write pulse signal 124 to cause the laser driver 106 to generate laser driver signal 121.

The dynamic write strategy table 108 also receives the CLV decoded data 128 and generates a third control signal 125 to cause write pulse generator 107 to adjust the write pulse signal 124.

In FIG. 1, the ATIP decoded data 131 comprises the ATIP and biphase clock. Wherein the biphase clock provides a pulse 127 to the clock synthesizer 104 to generate clock signal 130. The CLV decoded data 128 comprises a CLV value, which equals to the count of the biphase clock detected by the CLV value detector 100 at the fixed time interval. In addition, the second control signal 130 comprises a laser recording power value corresponding to the CLV value. The laser power value can be set as a fixed value. The fixed value can be gained from an optimized value in experiments.

Figure 2:
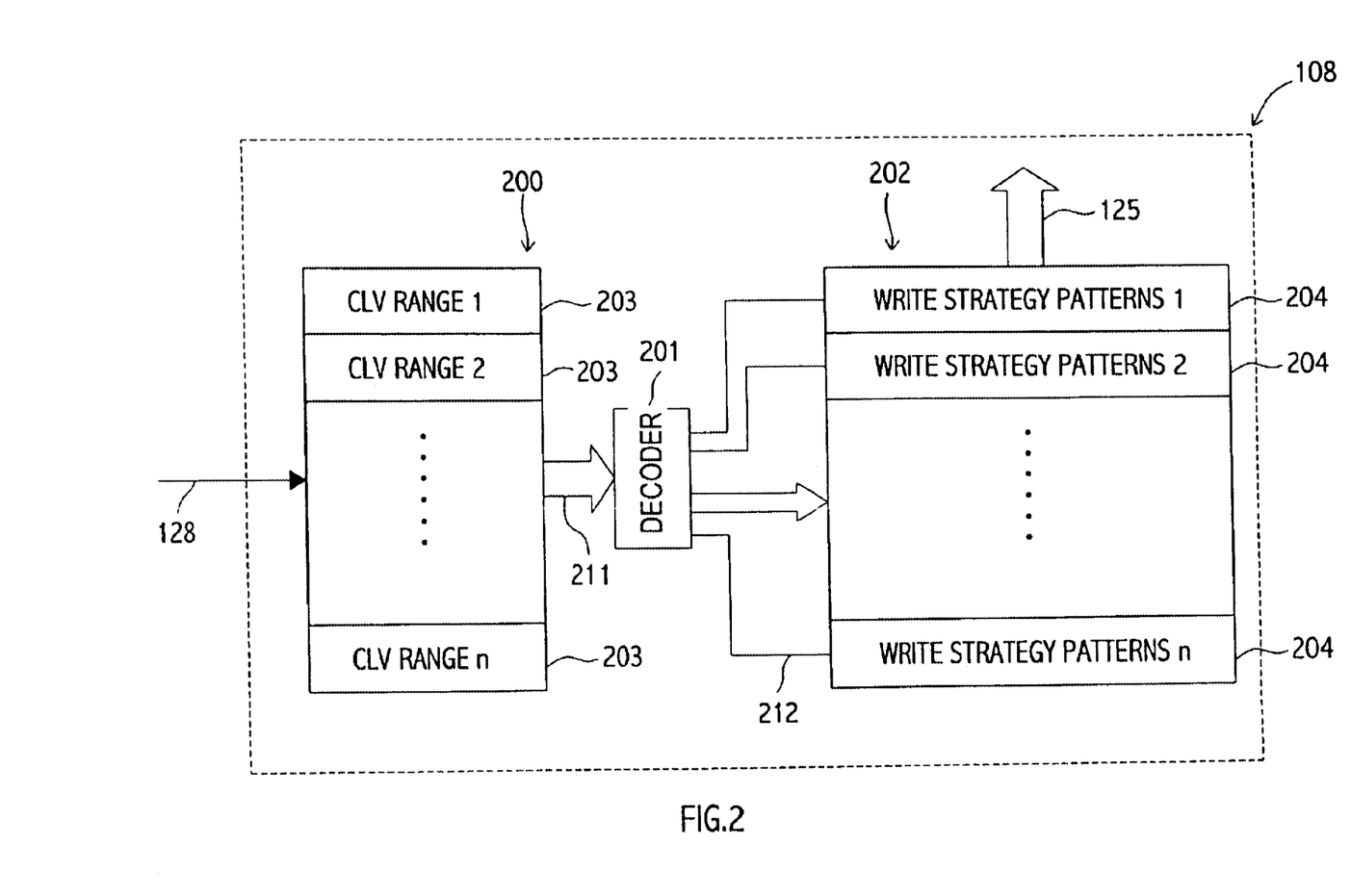
FIG. 2 is a block diagram of the dynamic write strategy table in the system of the present invention.

Referring to FIG. 2, the dynamic write strategy table 108 comprises: a CLV value detector 200, a decoder 201 and a recorded medium 202. The CLV value detector 200 is used for receiving the CLV decoded data 128, determining a CLV value of the CLV decoded data is within a fixed CLV range 203 and generating a CLV value signal 211. The CLV value signal 211 comprises an index value representing the fixed CLV value range 203.

The decoder 201 is used for receiving the CLV value signal 211 and as a result generates a corresponding address signal 212. The recorded medium 202 is used for recording a plurality of write strategy patterns 204. Each write strategy pattern 204 corresponds to an address signal 212. Each third control signal 125 corresponds to a address signal 212. Thereafter receiving address signal 212, a corresponding third control signal 125 is generated. The CLV value detector 200 comprises a matrix used for determining the fix CLV value range 203, corresponding to the CLV value, in the CLV decoded data 128. Wherein the CLV value detector 200 can be either software or hardware. In addition, the recorded medium 200 can be performed by a SRAM (Static Random Access Memory).

Figure 3:
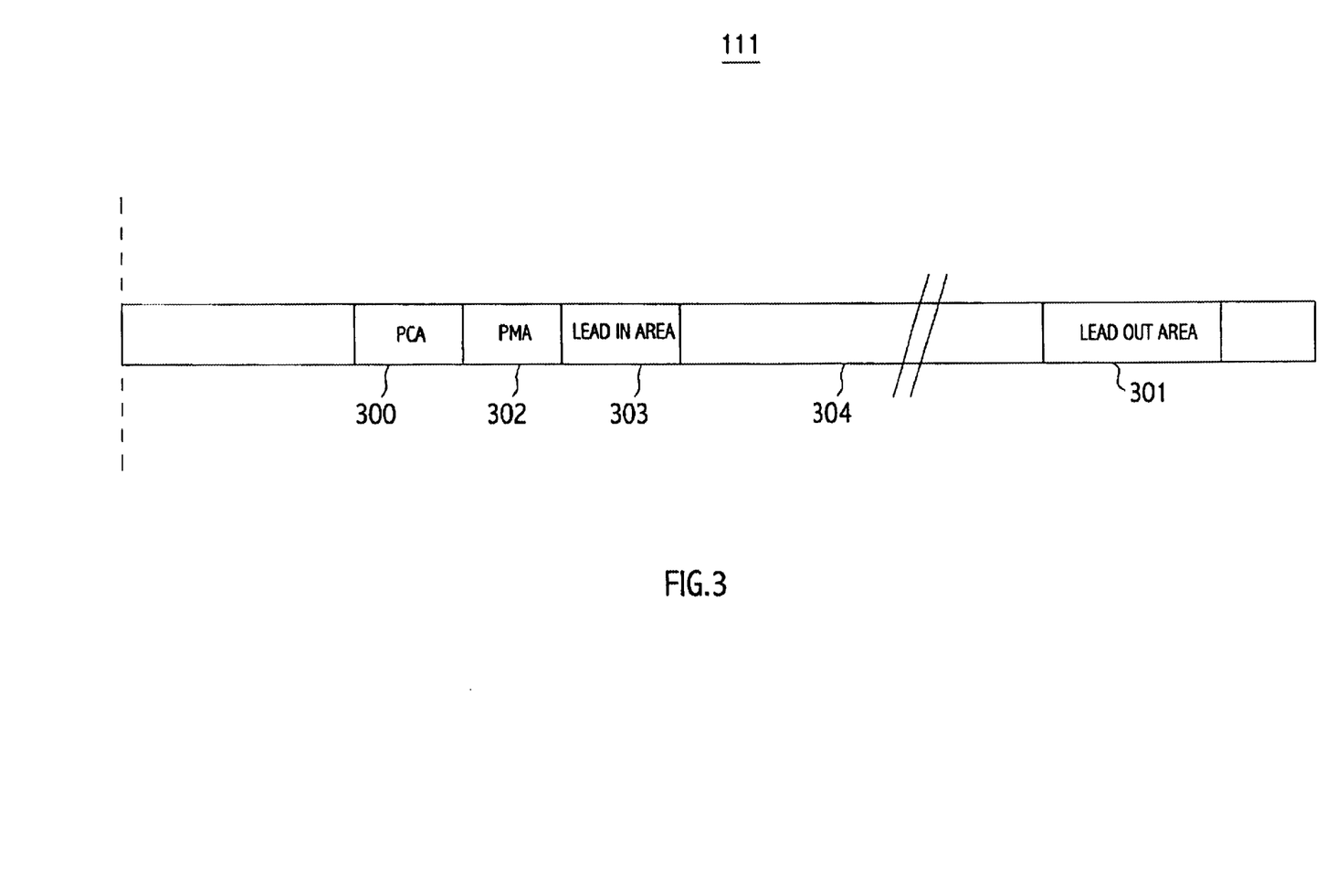
FIG. 3 is a perspective view of the disk data in the system of the present invention.

FIG. 3 is a perspective view of the specification of the disk 111 in the system of the present invention. The disk 111 comprises a PCA (Power Calibration Area) 300, a PMA (Program Mainly Area), a lead in area, a data area 304 and a lead out area 301 ranging from inner tracks to outer tracks. The PCA 300 is used for providing an area performing an OPC (Optimal power Calibration). The PMA is used for providing an area performing data trial recording. The lead in area is used for labeling the start of the data area. The data area 304 is where the data is recorded on the disk 111. Next to the data area 304 is the lead out area, which is used for labeling the end of the data area.

Figure 4:
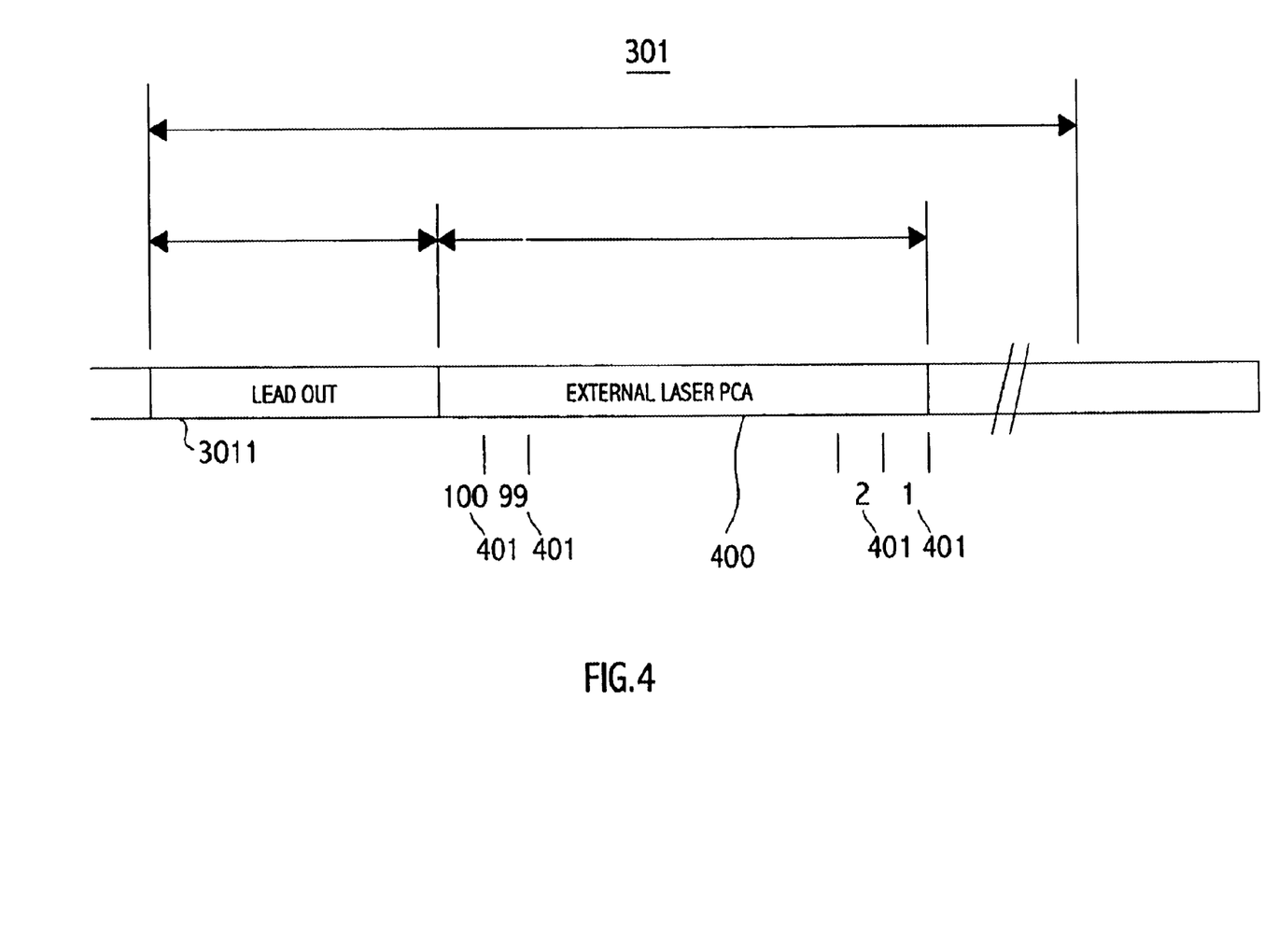
FIG. 4 is a perspective view of the lead out area of the disk data in the system of the present invention.

In the preferred embodiment according to the present invention, there is only the inner half of the lead out area is used for labeling the end of the data. Referring to FIG. 4, the outer half of the lead out area 301 on the disk 111 is assigned as an external laser PCA 400, wherein the external laser PCA 400 is divided into 100 units. Each external laser PCA unit is further divided into 15 blocks providing as the area for the laser power control 101 to perform an OPC. Referring to the FIG. 5, when the spindle 109 is under fixed CAV control format, via PCA 300, and external laser PCA 400, a linear equation 500 for optimized laser recording power is generated from interpolation, which is used for calculating an optimized laser recording power with desired CLV value.

Figure 5:
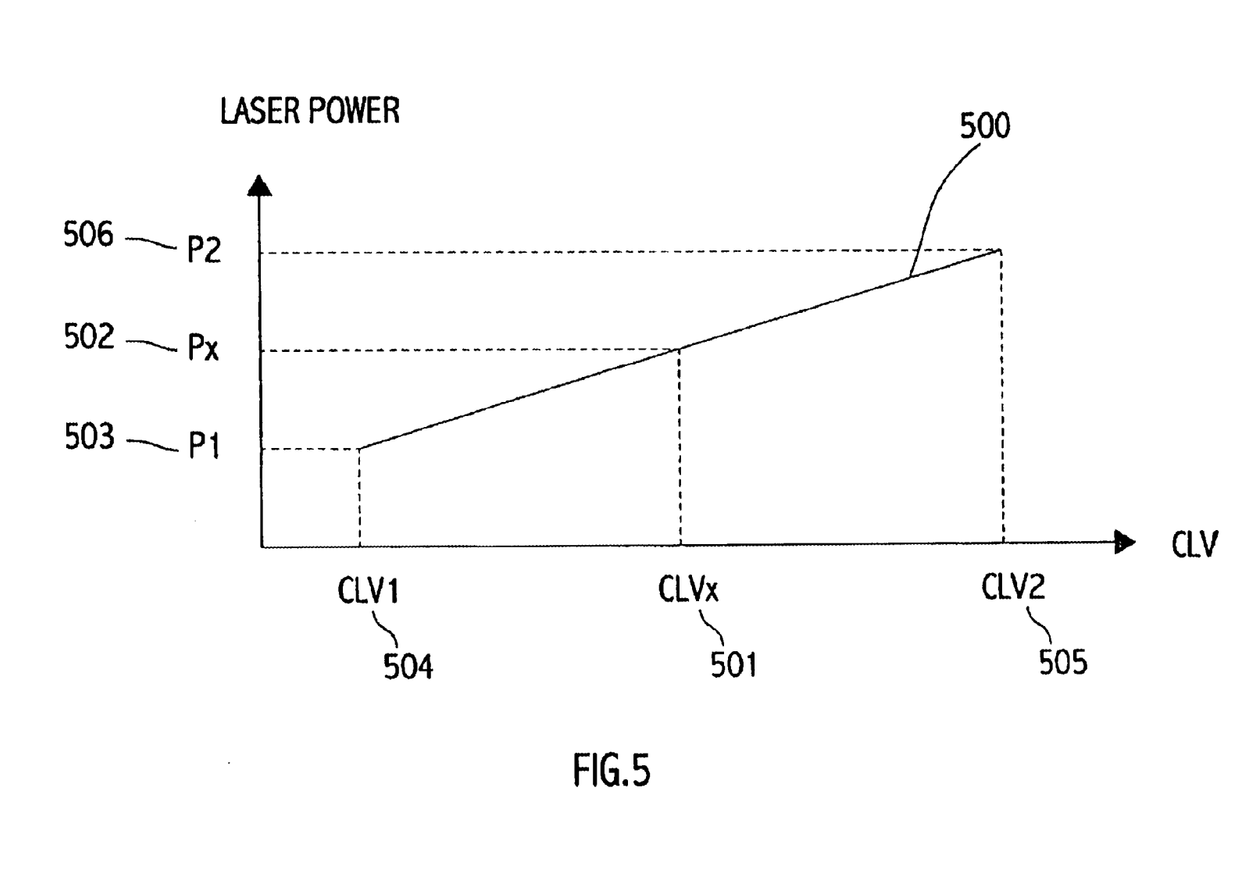
FIG. 5 is a perspective view of the interpolation curve of the system of the present invention.

With the linear equation 500 and a current CLVx 501, a corresponding optimum laser power Px 502 can be attained. When an OPC is performed in the PCA 300 in the inner tracks in the disk 111, an optimum laser recording power P1 503 is attained. At the same time, the CLV value detector 100 detects the corresponding CLV value, CLV1 504. Furthermore, when an OPC is performed in the external laser PCA 400 in outer tracks of the disk 111, an optimum laser recording power P2 506 is attained. At the same time, the CLV value detector 100 detects a corresponding CLV value, CLV2 505. In other words, given the spindle 109 is under fixed CAV control format, via performing an OPC in the PCA 400 and the PCA 400 of the disk 111 and attaining corresponding optimum laser powers and corresponding CLV values, the linear equation 500 generated by interpolation is generated.

Figure 6:
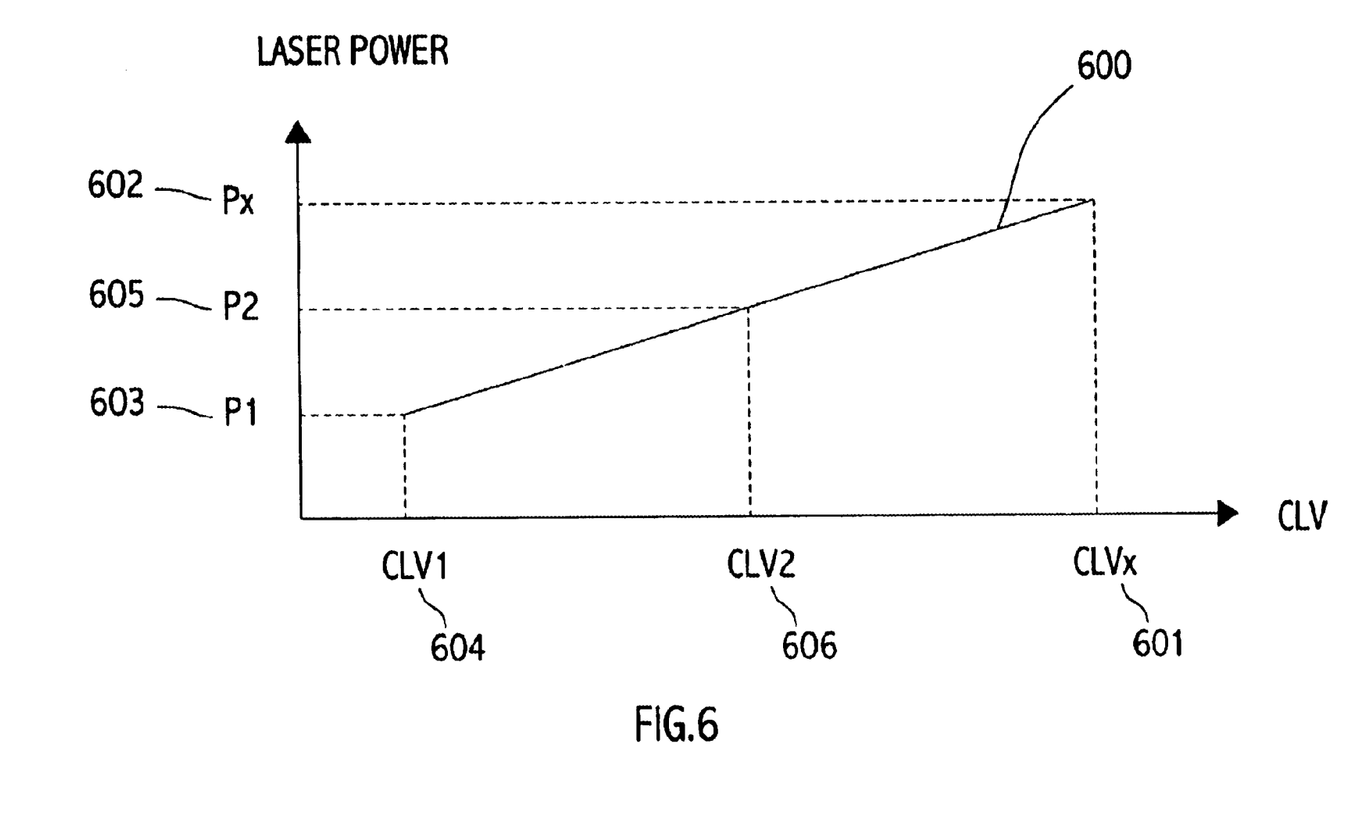
FIG. 6 is a perspective view of the extrapolation curve of the system of the present invention.

In addition, when the spindle 109 is under variable CLV control format, a linear equation 600 for optimized laser recording power can be generated by extrapolation as shown in FIG. 6. With the linear equation 600 and a current CLVx 601, a corresponding optimum laser power Px 602 can be attained. At first, set the spindle 101 under a first fixed multiple CLV control format. An OPC in the PCA 300 is performed and renders an optimized laser recording power P1 603 of the inner track area of the disk. At the same time, the CLV value detector 100 detects a corresponding CLV value CLV1 604 of the inner track area.

Then, set the spindle 109 under a second fixed multiple CLV control format. Similarly, an OPC in the PCA 300 is performed and renders an optimized laser recording power P2 605 of the inner track area of the disk. At the same time, the CLV value detector detects a CLV value CLV2 606 of the inner track area. As such, using extrapolation with the two sets of CLV values and corresponding optimized laser recording power from performing the OPC in the inner track under the first and the second multiple CLV control format, a linear equation for optimized laser recording power is generated.

Based on the embodiment shown in the FIG. 1, FIG. 2, FIG. 3, FIG. 4, FIG. 5 and FIG. 6, the present invention discloses a laser power method control method, which is used for recording data on a disk under CAV control format wherein the disk data is recorded under CLV control format.

According to the embodiment the disk inner tracks comprises a PCA 300, the disk outer tracks comprises a lead out area 301.

Figure 7:
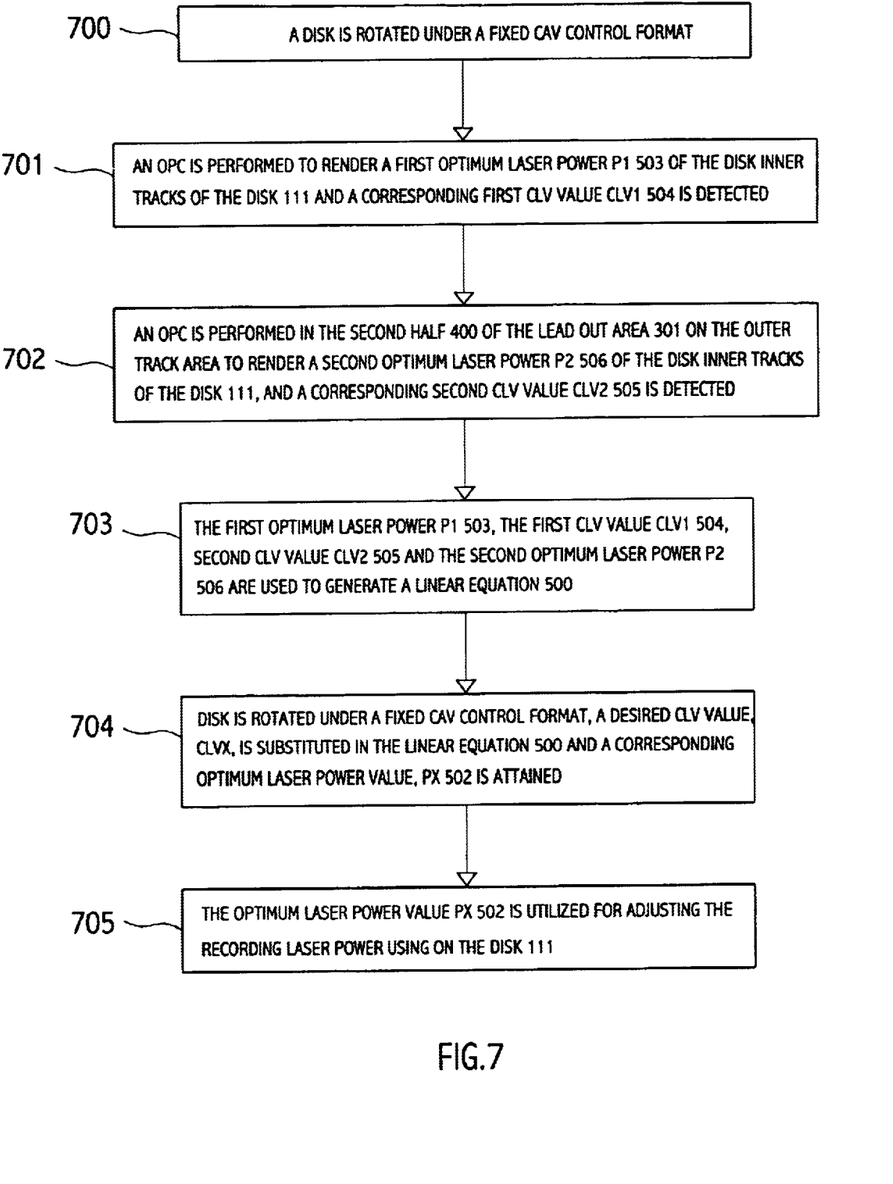
FIG. 7 is a flowchart of the first laser power control method of the system of the present invention.

FIG. 7 illustrates the first control method 70 comprising step 700, a disk is rotated under a fixed CAV control format. In step 701, an OPC is performed in the PCA 300 to render a first optimum laser power P1 503 of the disk inner tracks of the disk 111 and a corresponding first CLV value CLV1 504 is detected. In step 702, an OPC is performed in the second half 400 of the lead out area 301 on the outer track area to render a second optimum laser power P2 506 of the disk inner tracks of the disk 111, and a corresponding second CLV value CLV2 505 is detected. In step 703, the first optimum laser power P1 503, the first CLV value CLV1 504, the second optimum laser power P2 506 and the second CLV value CLV2 505 are used to generate a linear equation 500. Thereafter in step 704, disk is rotated under a fixed CAV control format, a desired CLV value CLVx is substituted in the linear equation 500 and a corresponding optimum laser power value Px 502 is attained. In step 705, the optimum laser power value Px 502 is utilized for adjusting the recording laser power using on the disk 111.

In the above-mentioned method, the second half 400 of the lead out area 301 on the outer track area is assigned as an external laser PCA. The external laser PCA is further divided into 100 external laser PCA units, each external laser PCA unit is divided into 15 blocks provided as an area for an OPC to be performed by a laser power control.

Figure 8:
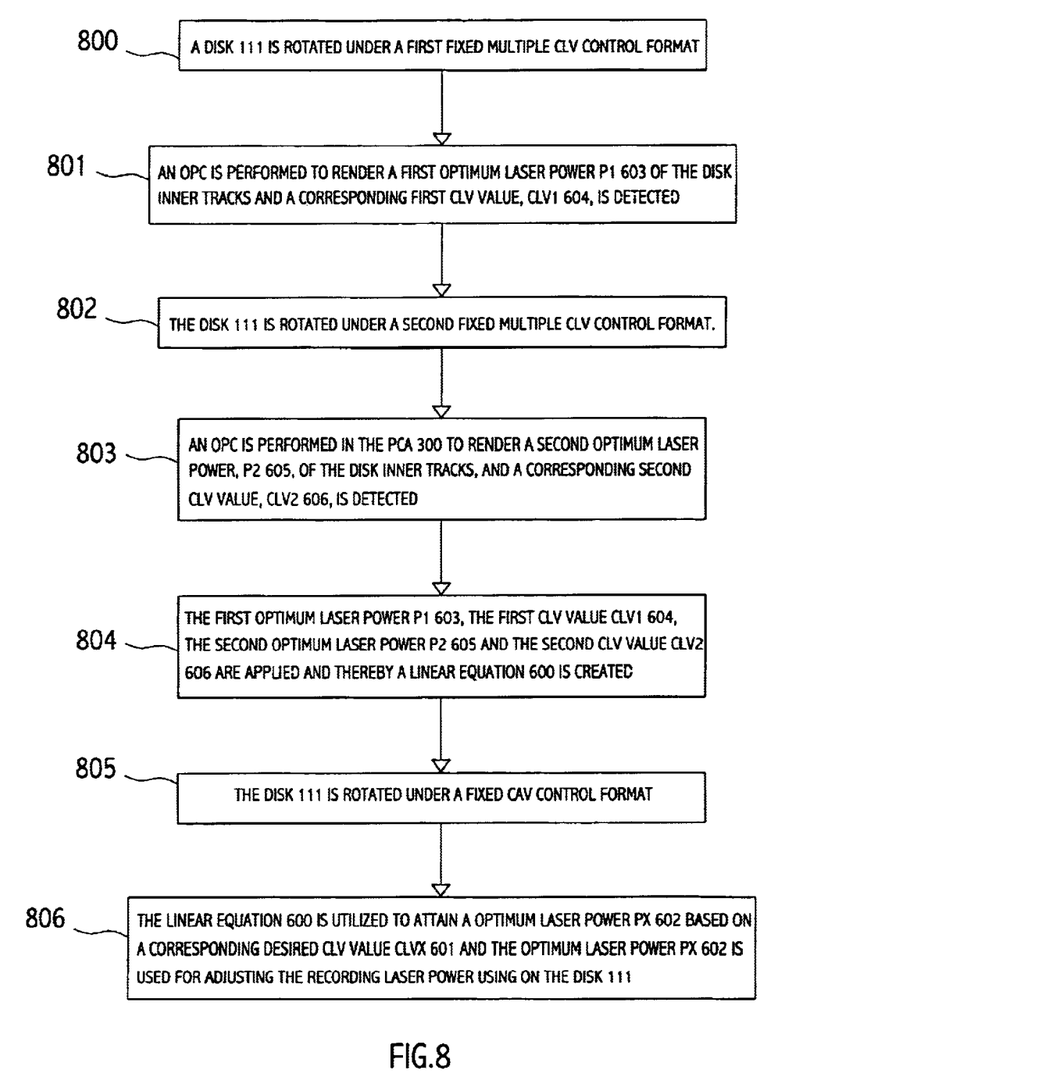
FIG. 8 is a flowchart of the second laser power control method of the system of the present invention.

According to the method based on the embodiment shown in the FIG. 1, FIG. 2, FIG. 3, FIG. 4, FIG. 5 and FIG. 7, a linear equation 600 can be generated merely by performing an OPC in the PCA 300 on the inner tracks of the disk 111. As shown in FIG. 8, the second control method 80 comprises: step 800, a disk 111 is rotated under a first fixed multiple CLV control format. step 801, an OPC is performed in the PCA 300 to render a first optimum laser power P1 603 of the disk inner tracks and a corresponding first CLV value, CLV1 604, is detected. In step 802, the disk 111 is rotated under a second fixed multiple CLV control format. In step 803, an OPC is performed in the PCA 300 to render a second optimum laser power, P2 605, of the disk inner tracks, and a corresponding second CLV value, CLV2 606, is detected. In step 804, the first optimum laser power P1 603, the first CLV value CLV1 604, the second optimum laser power P2 605 and the second CLV value CLV2 606 are applied and thereby a linear equation 600 is created. In step 805, the disk 111 is rotated under a fixed CAV control format. In step 806, the linear equation 600 is utilized to attain a optimum laser power Px 602 based on a corresponding desired CLV value CLVx 601 and the optimum laser power Px 602 is used for adjusting the recording laser power using on the disk 111.

According to the above-described embodiment, the linear equation 500 and the linear equation 600 is generated via interpolation and extrapolation respectively. In other words, the method 170 generates the linear equation 500 via corresponding optimum laser powers and corresponding CLV values attained form performing an OPC in the inner tracks and outer tracks in the disk 111 under a fixed CAV control format. The method 280 generates the linear equation 600 via corresponding optimum laser powers and corresponding CLV values attained form performing an OPC merely in the inner tracks of the disk.

While the invention has been described with reference to various illustrative embodiments, the description herein should not be construed in a limiting sense. Various modifications of the illustrative embodiments, as well as other embodiments of the invention, will be apparent to those skilled in the art upon reference to this description. It is therefore contemplated that the appended claims will cover any such modifications or embodiments as may fall within the scope of the invention defined by the following claims and their equivalents.

What is claimed is:

1. A system using CAV (Constant Angular Velocity) control format for recording data on a disk where the existing recorded data is recorded with CLV (Constant linear Velocity) format, the system comprising:
   a spindle, used for rotating the disk;
   a spindle control, used for taking control of the spindle rotating;
   a PUH (Pick-Up Head), used for reading and recording on the disk;
   a laser driver, generating and outputting a laser driver signal to the PUH for causing the PUH to generating a feed signal and a wobble signal, the wobble signal reflected by the optical disk and then read by the PUH;
   an automatic power control, used for receiving the feed signal and generating a first control signal used for causing the laser driver to adjust the laser driver signal;
   a write pulse generator, used for generating a write pulse signal to control the laser driver signal of laser driver;
   a clock synthesizer, used for providing a clock signal with the write pulse generator;
   an ATIP (Absolute Time In Pre-grooves) decoder, used for collecting the wobble signal and generating an ATIP decoded data;
   a CLV value detector, used for receiving the ATIP decoded data and generating a CLV decoded data;
   a laser power control, used for receiving the CLV decoded data and generating a second control signal, which is used for causing the automatic power control to adjust the first control signal; and
   a dynamic write strategy table, used for receiving the CLV decoded data, providing a third control signal, and causing the write pulse generator to adjust the write pulse signal.

2. The system of claim 1, wherein the ATIP decoded data comprising the ATIP and a biphase clock.

3. The system of claim 2, wherein the biphase clock used for causing clock synthesizer to generate a clock signal.

4. The system of claim 3, wherein the CLV decoded data comprises a CLV value as the disk rotating real-time, and the CLV value equals to the equals to the count of the biphase clock detected by the CLV value detector at the fixed time interval.

5. The system of claim 4, wherein the second control signal comprises a laser recording power corresponding to the CLV value.

6. The system of claim 5, wherein the laser power is set as a fixed value.

7. The system of claim 4, wherein the disk inner tracks comprise a PCA (Power Calibration Area), used for providing an area for laser power calibration an OPC (Optimal power Calibration) to occur.

8. The system of claim 7, wherein a external laser PCA is on the second half of the lead out area on the outer track area.

9. The system of claim 8, wherein the external laser PCA is divided into 100 units and each unit is divided into 15 blocks, which are used for providing laser power control for performing an OPC.

10. The system of claim 9, wherein when the spindle is under fixed CAV control format, a linear equation for optimized laser recording power is generated from interpolation, which is used for calculating an optimized laser recording power with desired CLV value, an OPC in the PCA is performed and renders an optimized laser recording power of the inner track area of the disk, at the same time, the CLV value detector detects a CLV value of the inner track area, in the same way, an OPC in the PCA is performed and renders an optimized laser recording power of the outer track area of the disk, the CLV value detector detects another CLV value of the inner track area, accordingly, using interpolation with the two sets of CLV values and corresponding optimized laser recording power from the OPC in the PCA in the inner and outer track, a linear equation for optimized laser recording power is generated.

11. The system of claim 7, wherein when the spindle is under variable CLV control format, a linear equation for optimized laser recording power is generated by extrapolation, at first, set the spindle under a first fixed multiple CLV control format, an OPC in the PCA is performed and renders a first optimized laser recording power of the inner track area of the disk, at the same time, the CLV value detector detects a first CLV value of the inner track area, then, set the spindle under a second fixed multiple CLV control format, similarly, an OPC in the PCA is performed and renders a second optimized laser recording power of the inner track area of the disk, at the same time, the CLV value detector detects a second CLV value of the inner track area, accordingly, using extrapolation with the first CLV value, second CLV value, corresponding first optimized laser recording power and corresponding second optimized laser recording power from the OPC in the PCA in the inner track under the first and the second multiple CLV control format, a linear equation for optimized laser recording power is generated.

12. The system of claim 1, wherein the dynamic write strategy table comprises:
   a CLV value detector used for receiving the CLV decoded data, determining a CLV value of the CLV decoded data is within a fixed range and generating a CLV value signal, the CLV value signal comprises an index value representing the fixed value range;
   a decoder, used for receiving the CLV value signal and as a result generating a corresponding address signal;
   a recorded medium, used for recording a plurality of write strategy patterns;
   each write strategy pattern corresponds to an address signal and thereafter generating a corresponding third control signal.

13. The system of claim 12, wherein the CLV value detector comprises a matrix, used for determining the fixed value range corresponding to the CLV value.

14. The system of claim 12, wherein the CLV value detector can be either software or hardware.

15. The system of claim 12, wherein the recorded medium is high speed SRAM (Static Random Access Memory).

16. A laser power control method for recording data on a disk under CAV (Constant Angular Velocity) control format where the existing recorded data is recorded with CLV (Constant linear Velocity) format, the disk inner tracks having a PCA (Power Calibration Area), the disk outer tracks further having a lead out area, the control method rotating under a fixed CAV control format and comprising:
   performing OPC (Optimal power Calibration) in the PCA and rendering a first optimum laser power of the disk inner tracks, detecting a corresponding first CLV value;

performing OPC in the second half of the lead out area on the outer track area and rendering a second optimum laser power of the disk inner tracks, detecting a corresponding second CLV value;

applying the first optimum laser power, the first CLV value, the second optimum laser power and the second CLV value and thereby creating a linear equation;

using the linear equation and attaining a third optimum laser power based on a corresponding third CLV value;

adjusting the recording laser power based on the third optimum laser power.

17. The method of claim 16, wherein a external laser PCA is on the second half of the lead out area on the outer track area.

18. The method of claim 17, wherein the external laser PCA is divided into 100 units, each unit is divided into 15 blocks, used for providing an area for the laser power control to perform OPC.

19. A laser power control method for recording data on a disk under CAV (Constant Angular Velocity) control format where the existing recorded data is recorded with CLV (Constant linear Velocity) format, the disk inner tracks having a PCA (Power Calibration Area), the control method comprising:

rotating the disk under a first fixed multiple CLV control format;

performing OPC (Optimal power Calibration) in the PCA and rendering a first optimum laser power of the disk inner tracks, detecting a corresponding first CLV value;

rotating the disk under a second fixed multiple CLV control format;

performing OPC in the PCA and rendering a second optimum laser power of the disk inner tracks, detecting a corresponding second CLV value;

applying the first optimum laser power, the first CLV value, the second optimum laser power and the second CLV value and thereby creating a linear equation;

rotating the disk under a fixed CAV control format;

using the linear equation and attaining a third optimum laser power based on a corresponding third CLV value;

adjusting the recording laser power based on the third optimum laser power.

20. The method of claim 19, wherein the linear equation is an interpolation.

21. The method of claim 19, wherein the linear equation is an extrapolation.

* * * * *